May 6, 1969  N. HORWOOD ET AL  3,442,133
DIFFERENTIAL PRESSURE GAUGE

Filed Aug. 28, 1967

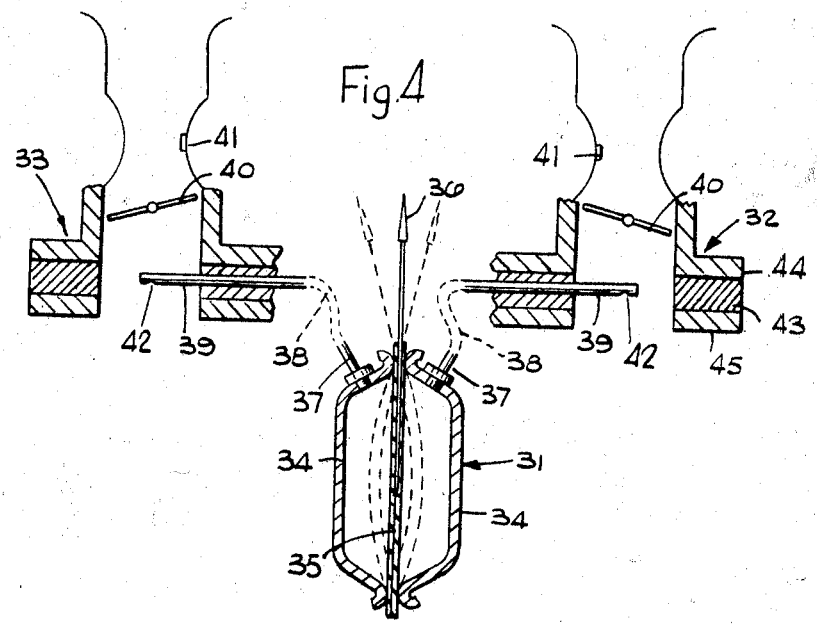

United States Patent Office 3,442,133
Patented May 6, 1969

3,442,133
DIFFERENTIAL PRESSURE GAUGE
Norman Horwood, Moseley, Alexander Gray, Greenock, and James Irving Nevill, Doveridge, England, assignors to Gray Horwood Engineering Limited, Birmingham, England, a British company
Filed Aug. 28, 1967, Ser. No. 663,826
Int. Cl. G01l 7/08
U.S. Cl. 73—407
2 Claims

ABSTRACT OF THE DISCLOSURE

A differential pressure gauge in which there are two chambers to be connected to the pressure to be compared. The chambers are closed either by a common diaphragm or by separate diaphragms and means lying outside the chambers are provided for indicating diaphragm movement. The gauges can be used for balancing air flow in carburetors.

BACKGROUND OF THE INVENTION

Field of the invention

The invention relates to differential pressure gauges using diaphragms.

Description of the prior art

Heretofore differential pressure gauges have normally been of the type in which there are two chambers, which are adapted to be connected to the pressures to be compared, and a common diaphragm closing the chambers. Means for indicating the movement of the diaphragm has normally been connected thereto and passes through the wall of one of the chambers so that sealing problems have been encountered where the transmitting means passes through such wall. It has also been proposed to provide a differential pressure gauge having two diaphragms, one of the diaphragms being connected to means for transmitting its movement to an indicator, the space between the diaphragms being filled with hydraulic fluid. This arrangement has the disadvantage that there are still sealing problems where the transmitting means passes through the wall of the chamber which contains the hydraulic fluid between the diaphragms. It has also been proposed to have a single, metallic diaphragm separating the two chambers and having a part projecting therefrom to act as an indicating or operating means.

Summary of the invention

The invention provides a differential pressure gauge comprising two adjacent chambers separated from each other by a common flexible diaphragm formed of two pieces of material adhered together, means associated with each chamber for admitting pressure fluid thereto and means to indicate or transmit the changes in position of the diaphragm under the influence of the pressures in the chambers, said indicating or transmitting means lying wholly outside the chambers and comprising a pointer, arm or the like which is sandwiched between said pieces of the common diaphragm and which extends outwardly from the outer peripheral edge of the common diaphragm. By this arrangement, the transmitting means lies wholly outside the chambers to which the pressures to be compared are admitted and the chambers are independently sealed by said pieces.

Brief description of the drawing

The invention will now be described in detail by way of example with reference to the accompanying diagrammatic drawings, in which:

FIGURE 4 is a diagram showing a further form of differential pressure gauge adapted for the balancing of two carburetors.

Figure 1:
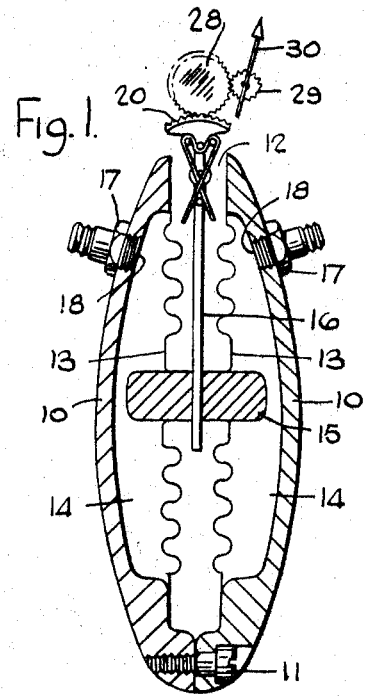
FIGURE 1 is a transverse section of a differential pressure gauge embodying the invention.
Figure 2:
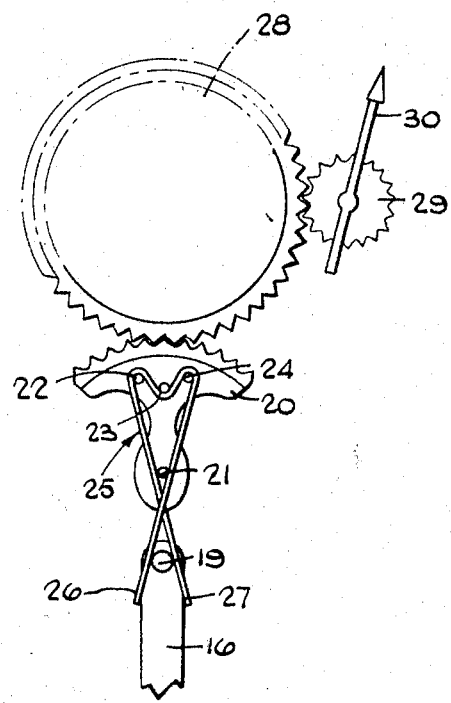
FIGURES 2 and 3 are front and side elevations of the connection between the transmitting means of the pressure gauge and a pivotal indicating mechanism.
Figure 3:
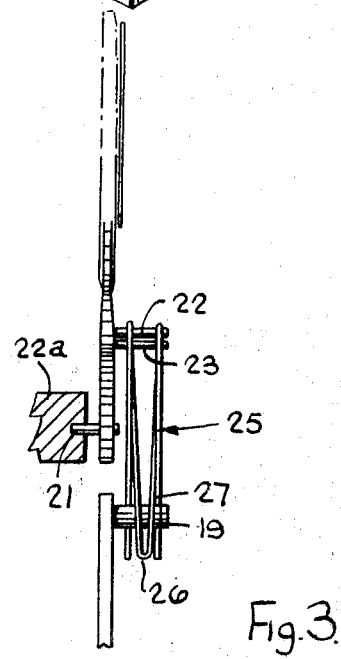

Referring first to FIGURES 1, 2 and 3, the differential pressure gauge there shown comprises two similar, concave, chamber-forming elements whose peripheries are connected together around a major portion thereof by means of screws 11. A gap 12 is left between corresponding portions of the peripheries to allow for the mounting of transmitting means as will be described hereinafter. Each chamber-forming element has secured thereto a diaphragm 13 formed of thin corrugated metal so that a chamber 14 is provided between each concave chamber-forming element 10 and its associated diaphragm 13. The diaphragms 13 are in aligned face to face relation and are rigidly connected together at their centres by a mechanical coupling 15 and this coupling secures an arm 16 to the centres of the diaphragms. The arm 16 extends radially outwardly from the coupling 15 into the gap 12 mentioned above.

Each element 10 carries a threaded inlet union 17 which communicates with an aperture 18 in the wall of the element so that pressure fluid may be admitted through the unions 17 into the chambers 14.

Referring now particularly to FIGURES 2 and 3, the outer end of the arm 16 carries a projection 19 which is adapted to rock a quadrant 20 which is pivoted about a pivot pin 21 to a fixed bracket 22a. The quadrant carries three spaced projections 22, 23 and 24, the projection 23 being out of line with the projections 22 and 24. A spring 25 is entrained around the projections and as shown in FIGURE 3 the spring is formed from one length of spring wire and has a U-shaped arm 26 and an arm 27 comprising two spaced members. The spring is so shaped that the arms 26 and 27 engage on opposite sides of the pin 19 and the middle portion of the spring is entrained around the projections 22, 23 and 24. The arms 26 and 27 are crossed as shown in FIGURE 2 and tend to move to parallel positions thus bearing on the opposite sides of the projection 19. It follows that when the projection 19 moves from side to side there is no lost motion between the projection and the quadrant 20.

As shown in FIGURE 1, the quadrant 20 drives a toothed gear 28 which in turn drives a smaller gear 29 fixed to an indicating pointer 30.

The operation of the gauge is as follows: the different pressures are admitted respectively to the chambers 14 through the inlet unions 17, if the pressure in one of the chambers is greater than the pressure in the other chamber, the diaphragms, since they are connected together, will move in the direction of the chamber having the lower pressure and will thus move the arm 16. The projection 19 on the arm 16 will thus rock the quadrant 20 which in turn will drive the gear wheels 28 and 29 to rotate the pointer 30. The zero position of the pointer will be that in which the pressures in both chambers 14 are equal. Differences in pressures will be indicated by the pointer moving from this zero position and the sign of the pressure difference will be indicated by the direction in which the pointer moves from its zero position.

Referring now to FIGURE 4, this shows a differential pressure gauge 31 adapted to form part of balancing equipment for two carburetors 32 and 33. The differential pressure gauge is somewhat different from that shown in FIGURES 1, 2 and 3 and uses only a single diaphragm instead of a diaphragm assembly comprising two diaphragms as in the embodiment previously described. The differential pressure gauge thus consists of two concave, chamber-forming elements 34 which are secured together around their peripheries and whose edges abut opposite sides of a comparatively thick diaphragm 35 comprising two pieces of material adhered together forming effectively a single diaphragm. Inset between the two pieces is an indicating pointer 36 which extends from the periphery of the diaphragm outwardly thereof and extends inwardly to the centre of the diaphragm. The chamber-forming elements have inlet means 37 which are connected by pipes 38 of equal length and diameter to pitot tubes 39 arranged in the carburetors downstream of the butterfly valves or main air control valves 40. The fuel jets of the carburetors are indicated at 41. The hole 42 in each pitot tube faces downstream relative to the air flow through the carburetor. Conveniently, the pitot tubes 39 may pass through the thick washer 43 which is commonly inserted between the carburetor flange 44 and the flange of the inlet manifold 45.

Assuming that the zero position of the pointer 36 is known, the carburetors may be adjusted if they are out of balance until the pointer again returns to its zero position. In this position the pressure of the gas flowing through both carburetors is the same and the carburetors are balanced. The pitot tubes measure the algebraic sum of the static and dynamic pressures of the gas.

It will be appreciated that instead of the differential pressure gauge 31 being provided in the arrangement shown in FIGURE 4, this pressure gauge may be replaced by a different pressure gauge of the type shown in FIGURES 1, 2 and 3.

If desired, movement of the displaceable member of either of the forms of differential pressure gauges described may be communicated to electrical switches, transducers or contacts which activate indicator lamps or which may activate servo devices adapted to correct the settings of the carburetors until they are in balance.

Alternatively, the diaphragm by its deflection may be arranged to impart corrective rotary movement to one or other of a pair of helical cams which control the respective throttle shafts of the carburetors.

The carburetor balancing equipment can either be fitted as a permanent part of the induction system of an internal combustion engine or can be produced as a separate instrument capable of being applied to any induction system which it is required to examine and adjust or control.

Figure 5:
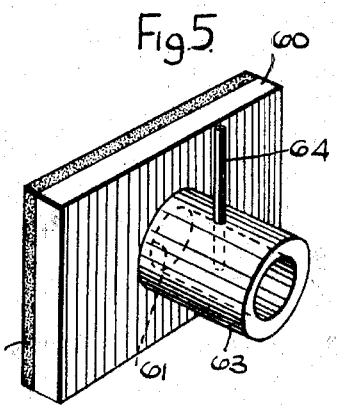
FIGURE 5 is a perspective view of a cover member which may form part of the balancing equipment.

In the latter case the equipment may comprise cover members such as the one shown in FIG. 5. Each cover member is adapted to be placed temporarily over the inlet to a carburetor where the equipment is to be portable, i.e. not built into the system as shown in FIGURE 4. The cover plate comprises a square plate 60 having a central aperture 61 and a sealing washer 62 of nonporous sealing material such as coated or impregnated sorbo-rubber adhered to one face. The plate carries a tube 63 inserted into the aperture 61 and having open ends and a pitot tube 64 is mounted to project into the bore of the tube 63 and has its aperture facing downstream i.e. towards the sealing washer 62. The pitot tubes 64 of two cover plates are joined to the inlets of a differential pressure gauge by tubes which are preferably of equal length and bore. It will be apparent that the cover plates can be held over the carburetor inlets to obtain measurement of the air flow into the carburetors which passes through the pipes 63.

It will be appreciated that where two diaphragms are used they may be formed of a suitable elastomeric material such as very thin latex sheet. The material from which the diaphragm is to be made will depend on the fluid whose pressure is to be measured.

We claim:
1. A differential pressure gauge comprising two adjacent chambers separated by a common flexible diaphragm formed of two pieces of material adhered together and which closes both of the chambers, means associated with each chamber for admitting pressure fluid thereto and means to transmit the changes in position of the diaphragm under the influence of the pressures in the chambers, said transmitting means lying wholly outside the chambers and comprising an arm which is sandwiched between said pieces of the common diaphragms and which extends outwardly from the outer peripheral edge of the common diaphragm.

2. A differential pressure gauge according to claim 1 wherein the arm extends inwardly to adjacent the centre of the diaphragm.

References Cited

UNITED STATES PATENTS

| 2,561,700 | 7/1951  | Hughes     | 73—407 |
| 2,809,516 | 10/1957 | Brush      | 73—118 |
| 2,964,062 | 12/1960 | Hunt       | 73—407 |
| 3,124,959 | 3/1964  | Pall et al. | 73—407 |
| 3,138,959 | 6/1964  | Elam et al. | 73—401 |

LOUIS R. PRINCE, *Primary Examiner.*

D. E. CORR, *Assistant Examiner.*